July 28, 1925.  1,547,525
R. L. SAXON ET AL
DUMPING BODY
Filed Dec. 6, 1924   2 Sheets-Sheet 1
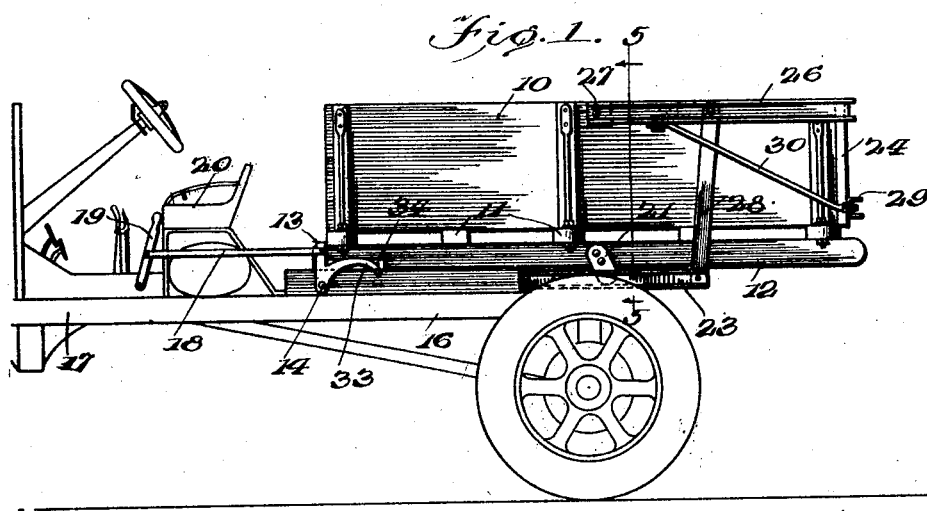
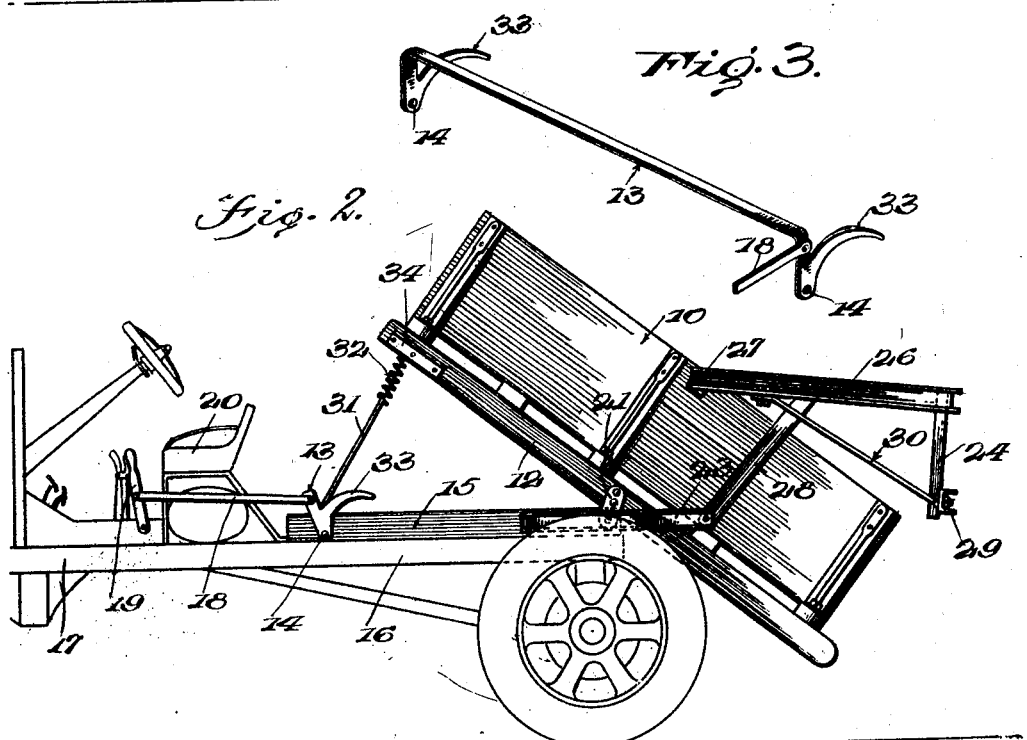
INVENTORS
J. W. Dickinson,
R. L. Saxon,
BY
ATTORNEYS July 28, 1925.　　　　　　　　　　　　　　　　1,547,525
R. L. SAXON ET AL
DUMPING BODY
Filed Dec. 6, 1924　　　　　　2 Sheets-Sheet 2

Patented July 28, 1925.

1,547,525

UNITED STATES PATENT OFFICE.

ROBERT LEE SAXON AND JOHN WESLEY DICKINSON, OF LITTLE ROCK, ARKANSAS.

DUMPING BODY.

Application filed December 6, 1924. Serial No. 754,370.

*To all whom it may concern:*

Be it known that we, ROBERT L. SAXON and JOHN WESLEY DICKINSON, citizens of the United States, and residents of Little Rock, in the county of Pulaski and State of Arkansas, have invented certain new and useful Improvements in Dumping Bodies, of which the following is a specification.

Our present invention relates generally to dumping bodies for vehicles, and more particularly to an automatic dumping body for motor trucks, our object being the provision of a construction including an automatically shifting tail gate whereby the dumping of the contents of the body may be accomplished without the necessity of the driver leaving his seat.

According to our invention the body, pivotally supported at its lower side portions intermediate its ends upon a body supporting structure, is normally latched in horizontal position against dumping movement by a mechanism under manual control of the driver, the body having a tail gate so constructed and arranged that it may be normally maintained in snug tight connection with the rear open end of the body when the latter is in normal position, and so mounted that when the body tilts rearward on its supporting pivots, the tail gate will be shifted vertically at the same time out of the way of the material flowing from the rear open end of the tilted body.

According to our invention considerable time is saved in releasing the tail gate connections and shifting the body to dumping position as it is usually accomplished. Our invention presents a construction especially adaptable to light trucks, of comparatively small tonnage.

Figure 4:
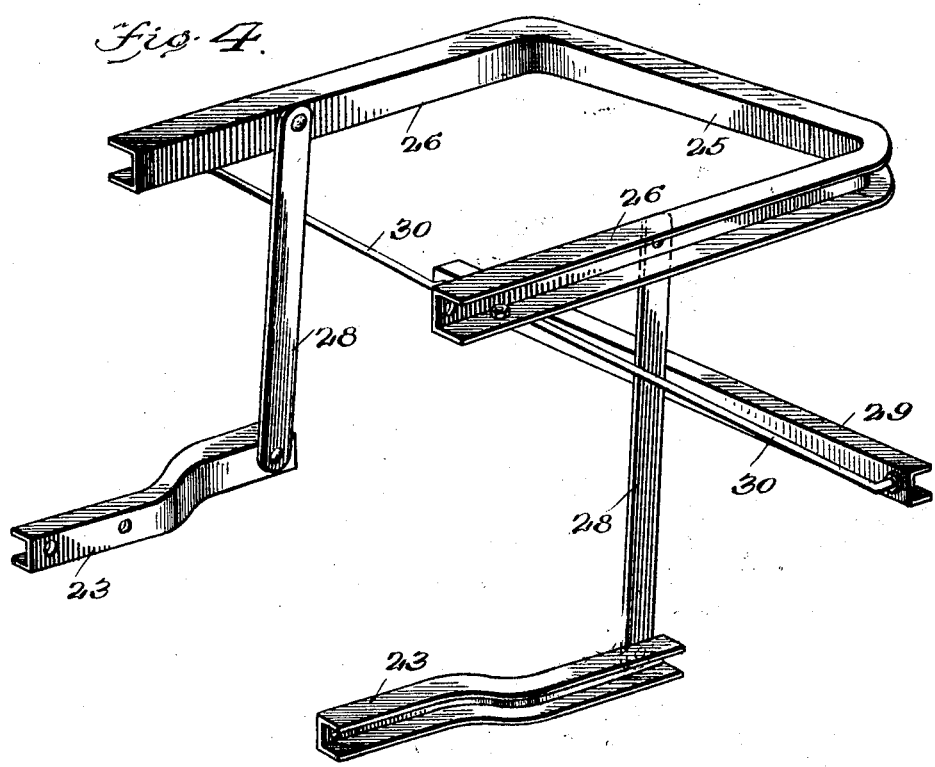
Figure 5:
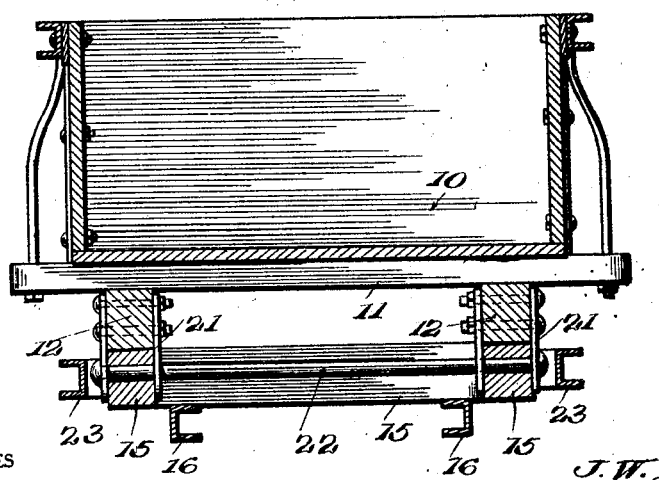

In the accompanying drawings which illustrate our present invention and form a part of this specification, Figure 1 is a side view showing the body in normally horizontal and latched position, Figure 2 is a similar view showing the body in the dumping position, Figure 3 is a detail perspective view of the latch frame, Figure 4 is an enlarged detail perspective view of the tail gate supporting and controlling connections, and Figure 5 is a vertical transverse section through the body and supporting structure substantially on line 5—5 of Figure 1.

Referring now to these figures, our invention proposes a dumping body 10, preferably supported by cross members 11, upon parallel longitudinal sleepers 12, the latter projecting at their opposite ends beyond the respective ends of the body. The forward ends of these sleepers form means for engagement by an inverted U-shaped latch frame 13 pivotally connected at its ends as at 14 upon the forward portions of a body supporting frame 15 bolted or otherwise rigidly secured in practice, upon the chassis 16 of a motor or other truck generally indicated at 17. To this latch frame 13 at one side is pivotally connected the rear end of a connecting arm 18 whose forward end is similarly connected to an upright control lever 19 pivotally mounted adjacent to the driver's seat 20 so that the latch frame 13 may be thus conveniently shifted forwardly and rearwardly to respectively release from and engage with the forwardly projecting ends of the sleepers 12.

The body is pivoted for rearward inclination and dumping by virtue of side pivot brackets 21 rigidly secured to the sleepers 12 intermediate the ends of the latter and pivotally engaged by a bolt 22 extending through the side portions of the body supporting frame 15 adjacent to the rear end of the latter, the forward portion of the body resting on this frame in the normally horizontal position shown in Figure 1 so that it becomes an easy matter to tilt the body rearwardly to the dumping position when the latch frame is released.

Secured to the sides of the supporting frame 15 and projecting rearwardly therebeyond are side beams 23 between the rearwardly projecting portions of which the body is free to tilt as will be seen by reference to Figure 2.

At its rear end the body 10 is open and in the normally horizontal position thereof the said open rear end is closed by a rigid tail gate 24 secured along its upper edge to the intermediate portion 25 of a U-shaped tail gate support whose extensions 26 project along the rear portion of the sides of the body and are pivotally connected at 27 to the said body sides intermediate the ends of the latter and adjacent to its upper edge, With these extensions 26 of the U-shaped tail gate support, are pivotally connected the upper ends of connecting bars 28, the lower ends of these bars being similarly connected to the rear ends of the side beams 23 just above mentioned, so that the tail gate and its U-shaped support will be shifted upwardly on the pivots 27 of the latter when the body is tilted rearwardly and downwardly in the dumping position shown in Figure 2.

The tail gate is pressed in its closed position, and may be uniformly maintained in tight engagement with the rear open end of the body in order to prevent leakage of material, by virtue of a cross brace or beam 29 extending across the lower edge of the tail gate and projecting at its ends beyond the sides of the tail gate. This beam or brace is securely fastened to the tail gate and at its ends adjustably receives the lower rear ends of tubular brace rods 30 whose upper forward ends are rigidly secured to the side extensions 26 of the U-shaped tail gate support, so that by adjusting the clamping nuts at the rear lower ends of these brace rods, the tail gate may be shifted so as to snugly engage those portions of the body around its open end at all times.

It is preferable that a flexible cable or other connection 31 be utilized between the forward end of the body and the adjacent forward portion of the body supporting frame 15, as shown in Figure 2, for the purpose of limiting movement of the body to the dumping position, and it is also preferable that this flexible connection include a spring and the like 32 so as to avoid overstraining the cable or other connection 31 when the body is heavily loaded.

It is obvious that upon release of the latch frame 13 in the position shown in Figure 1, it is a simple matter to shift the body to the dumping position shown in Figure 2, in view of its substantially balanced load, but in order that this may be done from the driver's seat, and in view of the fact that in some instances, the body is loaded heaviest adjacent to its forward end, the latch frame 13 is preferably provided at one or both sides with rearwardly curved lugs or arms 33 adapted to engage angle plates 34 secured to the forward side portions of the sleepers 12.

Thus, when the driver grasps the handle 19 and shifts the same forwardly from the position shown in Figure 1 in order to release the latch frame 13, the arms or lugs 33 will be shifted upwardly and will engage the angle plates 34 and kick the forward end of the body 10 upwardly so that it becomes overbalanced and falls of its own weight to the rearwardly inclined dumping position shown in Figure 2.

It is apparent from the foregoing that the dumping of the body as constructed according to our invention may be easily accomplished without necessitating movement of the operator from his seat, there being no need of releasing tail gate fastenings as is usually the case. Furthermore in our construction, the tail gate is shifted bodily away from its normal position and substantially out of the path of the material being dumped from the body.

We claim:—

A dumping body, a supporting structure therefor, to which the body is pivoted intermediate its ends, a latch mechanism carried by said structure engageable with the forward end of the body, a tail gate at the rear end of the body, a rigidly U-shaped support to the intermediate portion of which the tail gate is rigidly fastened at its upper edge, and the extensions of which support are pivoted at their ends to the upper side portions of the body, connecting bars pivotally connected at their upper ends to the said extensions of the tail gate support, and similarly connected at their lower ends to portions of the said body supporting structure, a brace beam extending across and secured along the lower edge of the tail gate and projecting beyond the sides thereof, and brace rods adjustably connected at their lower rear ends to the ends of said brace beam and rigidly fastened at their upper forward ends to the said extensions of the tail gate support.

JNO. WESLEY DICKINSON.
ROBERT LEE SAXON.